United States Patent [19]
Stewart

[11] Patent Number: 6,062,079
[45] Date of Patent: May 16, 2000

[54] APPARATUS FOR AUTOMATICALLY VERIFYING THE INSTALLATION AND ALIGNMENT OF AN AUTOMOTIVE DOOR

[75] Inventor: William J. Stewart, Fenton, Mo.

[73] Assignee: BECS Technology, Inc., St. Louis, Mo.

[21] Appl. No.: 08/916,906

[22] Filed: Aug. 19, 1997

[51] Int. Cl.[7] .............................. G01M 17/00; G01P 3/68
[52] U.S. Cl. ........................................... 73/488; 73/865.9
[58] Field of Search ..................................... 73/488, 865.9

[56] References Cited

U.S. PATENT DOCUMENTS

| | | | |
|---|---|---|---|
| 2,859,621 | 11/1958 | Knapf et al. | 73/865.9 |
| 4,471,662 | 9/1984 | Hamilton | 73/788 |
| 4,768,391 | 9/1988 | Hayes | 73/865.9 |
| 4,846,006 | 7/1989 | Thibeault | 73/865.9 |
| 5,379,656 | 1/1995 | Schrauwen et al. | 73/865.9 |
| 5,505,099 | 4/1996 | Tanaka | 73/865.9 |
| 5,627,767 | 5/1997 | Gosiniewicz et al. | 364/424.034 X |
| 5,641,918 | 6/1997 | Odanwald | 73/865.9 |
| 5,902,941 | 5/1999 | Gosiniewicz et al. | 73/865.9 |

FOREIGN PATENT DOCUMENTS

| | | |
|---|---|---|
| 269190 | 9/1992 | Japan . |
| 2252826 | 8/1982 | United Kingdom . |

*Primary Examiner*—Thomas P. Noland
*Attorney, Agent, or Firm*—Bryan Cave LLP

[57] ABSTRACT

An apparatus for verifying the installation and alignment of a moveable member of an object, such as, for example, the door of a vehicle. The final closing velocity of the moveable member is measured after the member is moved from an initial first position (e.g. opened) toward a second position (e.g. closed). The apparatus controllably engages and moves the movable member from its initial first position toward the second position by temporarily applying controlled force to the movable member. The apparatus determines the orientation of the object or of the moveable member and also includes a series of platforms that may be translated, rotated and raised so that moving the movable member of the object with the controlled force occurs when the moveable member is in a predetermined spatial position and orientation. The apparatus further determines the distance to the movable member so that the final closing velocity of the moveable member may be determined. The apparatus may be used to determine whether the moveable member closed properly when subjected to a closing force and also may be configured for use with a series of objects as the objects advance in sequence (such as down an assembly line) to be proximate the apparatus.

32 Claims, 2 Drawing Sheets

APPARATUS FOR AUTOMATICALLY VERIFYING THE INSTALLATION AND ALIGNMENT OF AN AUTOMOTIVE DOOR

FIELD OF THE INVENTION

The present invention relates generally to alignment verification systems and, more particularly, to devices used to reliably verify that an automobile door has been properly manufactured and installed.

BACKGROUND OF THE INVENTION

The necessity for accurate installation and alignment of vehicle (e.g., automotive) doors is commonly recognized. One key quality control aspect of modem automobiles is to verify that the doors of the automobile were manufactured, installed and aligned properly so that when one closes the door with a particular force, the door closes securely. Currently, most automobile manufacturers conduct manual tests on a small statistical sample of the vehicles they produce to determine if the doors of such vehicles are properly manufactured, installed and aligned. Typically, the test is not conducted as the vehicle is progressing through the assembly line, but, rather, by removing the vehicle from the assembly line.

Most automobile manufacturers have developed specifications for determining whether their vehicle doors are properly installed and aligned. The specifications generally require that the door achieve a final closing velocity (i.e., the velocity of the door just prior to the door engaging with the latch mechanism) when pushed closed with an initial, constant closing velocity. Several alternative methods have been proposed to test and verify that a door meets these specifications. For example, one such method is to mount a door velocity meter directly on the side of the vehicle adjacent to the door under inspection, i.e., on the body panel immediately behind the door. The door velocity meter measures the velocity of the exterior edge of the door (i.e., opposite the hinge) as the door is being closed. The door is then repeatedly, manually closed, while attempting to achieve and maintain a constant door initial closing velocity. Once the door is pushed in a fashion to achieve the desired door initial closing velocity, the velocity meter is read to determine the final closing velocity, which reading is then compared to an acceptable range. Additionally, the individual performing the test may observe whether or not the door properly engaged the latching mechanism and that the door closed flush with the adjacent body panel.

The difficulties using this approach are considerable. For example, because the test requires the vehicle to be removed from the assembly line, it is quite time-consuming. Additionally, the prior art method requires the door velocity meter to be attached to the vehicle itself and, thus, relies upon physical contact with the surface of the vehicle. Furthermore, because the vehicle must be removed from the assembly line, manufacturers typically only test a small fraction of the vehicles produced, increasing the likelihood that automobiles having faulty doors are undetected and are ultimately sold to consumers.

In another prior art method, developed by the assignee of the current invention and currently used in a small number of assembly plants, an actuator arm is mounted in a fixed position to engage with an open door as a vehicle passes through the test station on the assembly line. The actuator, upon engagement with a door, extends with a constant force and pushes the door toward its closed position. The vehicle's door is then manually inspected to determine if it completely closed and properly engaged the latch mechanism. While this semi-automated method permits testing of all vehicles on an assembly line without removing the vehicles to conduct the test, it suffers from disadvantages as well. For example, the method does not account for vehicles which may be mispositioned or misaligned on the assembly line, and, the method does not permit the testing of the final closing velocity of the door.

Thus, the aforementioned methods and systems do not guarantee a precise measurement of the velocity with which the door engages the latch mechanism, and cannot precisely determine whether an automobile door has been properly installed and aligned without further manual intervention. Therefore, there is a continuing need for an efficient and effective apparatus to verify that a door has been properly manufactured, installed and aligned on a vehicle. Preferably such a system would allow the initial door closing velocity to be directly controlled and/or measured and would automatically measure the final door closing velocity. Variations in a vehicle's position and orientation would be taken into account. Furthermore, the preferred apparatus would also determine if the door properly engaged the latch mechanism and was fully closed.

SUMMARY OF THE INVENTION

A preferred apparatus for verifying the installation and alignment of an automobile door having these features and satisfying these needs has now been developed. The apparatus of the present invention determines if the door has been manufactured and installed properly by measuring the velocity that the door closes when forced closed with a predetermined initial starting velocity. This velocity measurement is taken without contacting the vehicle or the door under inspection. The invention further verifies that the door properly closed flush with the adjacent body panel.

Accordingly, in a preferred embodiment of the invention, the apparatus determines the velocity of a movable member (e.g., a door) of an object (e.g., a vehicle) as the movable member moves from an initial first position (e.g. opened) toward a second position (e.g. closed). The apparatus includes movement means, such as an actuator, for controllably engaging and moving the movable member from its initial first position toward the second position by temporarily applying controlled force to the movable member. Upon application of the controlled force, the movable member progresses toward the second position. Preferably, the controlled force results in the moveable member moving at a controlled velocity. The apparatus also includes positioning means, such as a series of platforms that may be translated, rotated and raised, for positioning the movement means (or the object) so that moving the movable member of the object with the controlled force occurs when the movement means is in a predetermined spatial relationship with respect to the movable member. The apparatus further includes distance sensing means, for example, a laser distance sensor, for determining one of two measurements in timed relationship at two separate movable member positions as the movable member moves from the first position toward the second position after the controlled force has been applied to the movable member, either: (i) the distance between the movable member and the fixed point on the object; or (ii) the distance between the movable member and the distance sensing means. Additionally, the apparatus preferably includes velocity determination means for determining the velocity of the movable member based upon the two distances determined using the distance sensor. The apparatus may be configured for use with a series of objects as the objects advance in sequence (such as down an assembly line) to be proximate the apparatus.

The apparatus of the present invention may also be used to determine whether the door of a vehicle closed properly when subjected to a closing force. In this embodiment, the apparatus includes movement means for controllably engaging and moving the door from its open position toward the closed position by temporarily applying a controlled force to the door. The controlled force is applied such that, after the controlled force is removed, the door continues to progress toward the closed position. The apparatus also includes positioning means, such as an actuator, for positioning the movement means or the vehicle so that moving the door with the controlled force occurs when the movement means is in a predetermined spatial relationship with respect to the door. Additionally, the apparatus includes distance sensing means, such as a laser distance sensor, for determining the distance from the sensor to the door and for determining the distance from sensor to a position that is not on the door but is on the vehicle proximate the door (e.g., a body panel), such determinations being made when the sensor is appropriately positioned with respect to the vehicle. The apparatus in this embodiment also has means for determining when the sensor is appropriately positioned with respect to the vehicle and for causing the sensor to make the two distance determinations. The apparatus then determines the difference between the two distances determined by the sensor and compares the difference to a value that is appropriate for the vehicle to thereby determine whether the door closes properly.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
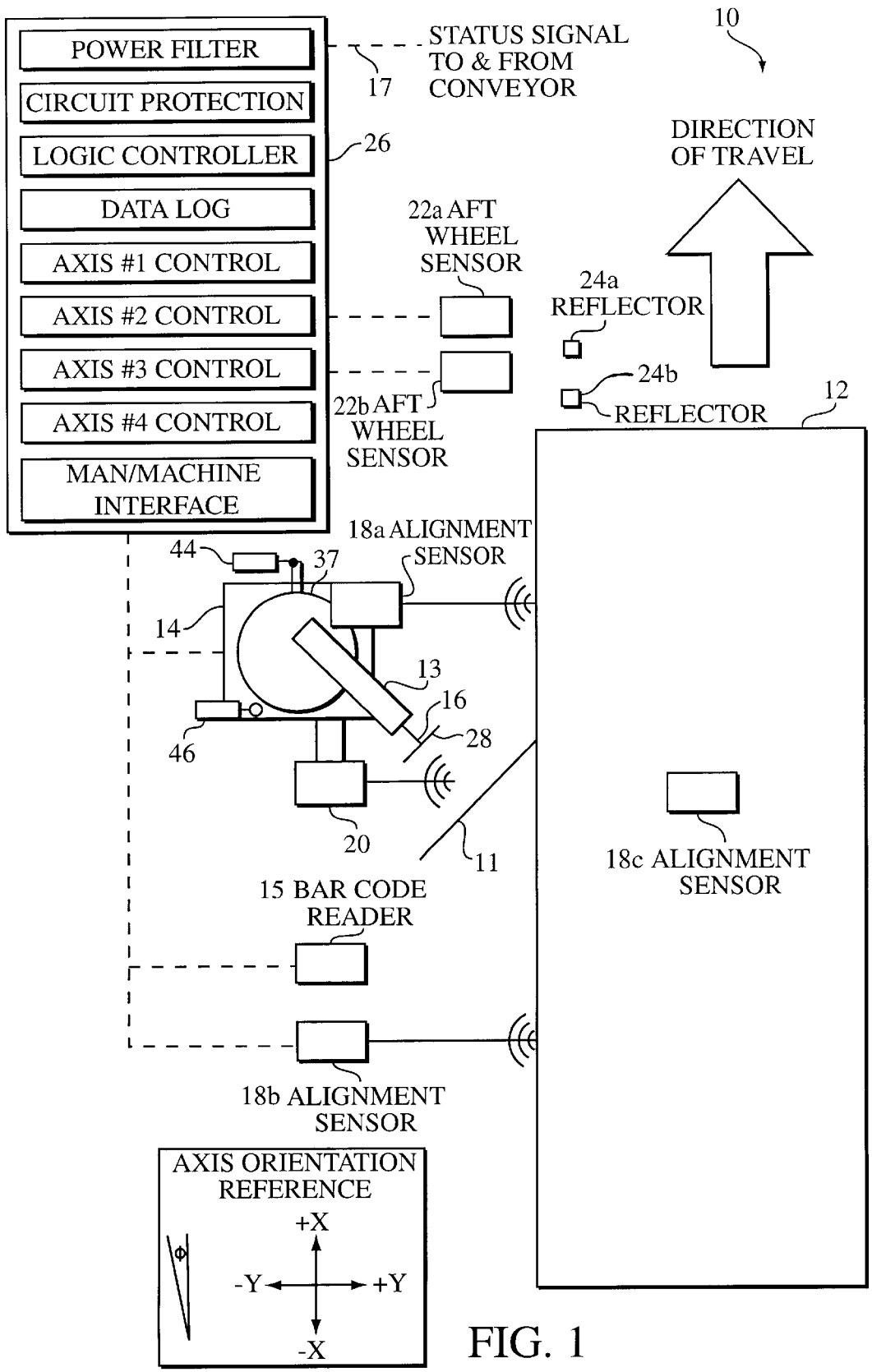
FIG. 1 is a diagrammatic representation of a presently preferred apparatus for use in connection with the present invention.

Referring now to FIG. 1, therein is illustrated a preferred apparatus generally designated by reference numeral 10. Apparatus 10 is shown as configured to measure the final closing velocity of door 11 of vehicle 12 when door 11 is closed with a constant, predetermined initial closing velocity. As one will readily appreciate, apparatus 10, using the principles disclosed herein, may be configured to measure the velocity of any movable member of any object as the moveable member advances from an initial first position to a second position. Although FIG. 1 shows apparatus 10 configured to test a door on the driver's side of vehicle 11, it will be appreciated that the components may be positioned on the passenger side of the vehicle in order to test doors on that side. Apparatus 10 comprises, as its principle elements, movement means, such as, for example, electronically-controlled actuator 13, which extends actuator arm 16 to impact and engage with door 11. Electronically-controlled actuator 13 is mounted on a movement means, such as positioning assembly 14, for properly orientating and positioning actuator arm 16 so that it engages door 11 at a constant, predetermined location for each vehicle passing through apparatus 10. Another principle element is a distance sensing means, such as laser distance sensor 20 for measuring the distance to door 11 in a number of door positions as door 11 is closed and as it approaches and engages a conventional door latch assembly (not shown). Apparatus 10 also preferably includes velocity determination means, such as logic contained within a programmable logic controller, for determining the velocity of door 11 from the distance measurements determined from laser distance sensor 20.

The principal components of apparatus 10 will now be described in detail. Preferably, apparatus 10 includes means for detecting and determining certain information regarding the particular vehicle 12 under inspection. Such information may include, for example, the vehicle identification number. As is known, in a automobile assembly plant, this information is typically encoded on a bar code strip placed on the window(s) of vehicle 12. For purposes of this description, it is assumed that the bar code strip has been placed on the window of the driver's door. A preferred design uses a conventional raster scan bar code reader (with detector) 15. Bar code reader 15 preferably has the ability to detect, read and decode the bar code strip(s) attached to one side of vehicle 12 and is sufficiently resilient to read bar codes strips that may not be installed properly, i.e., the strips may be slightly out of position or orientation. Bar code reader 15 preferably detects the presence of a vehicle 12 passing down the assembly line and into apparatus 10, which initiates the test of the vehicle's door. Bar code reader 15 may preferably further decode the vehicle model type and vehicle identification number from the bar code strip. Bar code reader 15 is in electronic communication with electronic control unit 26 and transmits the information detected from the bar code strip to control unit 26. Based upon this information, control unit 26 may initiate the other components of apparatus 10 to test door 11 and, additionally, may record the vehicle identification number (as well as other information that may be contained on the bar code strip) into a system database. Furthermore, as discussed below, the model of the vehicle under inspection may be used to control other system components. A preferred bar code reader 15 is a model 27755-SN8 Adaptascan Bar Code Reader, manufactured by Allen-Bradley. Alternatively, a linear scan reader, such as, for example, a model 2755-LD4C1 scanner with a model 2755 DSIA decoder, manufactured by Allen-Bradley, may be used. However, linear scan readers typically have a narrow field-of-view and, therefore, are less tolerant to variations in the placement of the bar code strips. Thus, it is important that the bar codes are applied to vehicle 12 with greater precision when using such linear scan readers.

Typically, as a vehicle progresses through an assembly line, there is some variation in the lateral and rotational orientation of the vehicle. Preferably, positioning assembly 14 may be adjusted in accordance with that variation to ensure that actuator arm 16 engages door 11 in a constant predetermined location. To account for this expected variation, preferably, apparatus 10 includes a number of vehicle alignment sensors 18, which begin detecting the orientation and placement of vehicle 12 upon detection of vehicle 12 by bar code reader 15. Preferably, alignment sensors 18 are non-contacting distance sensors that have a distance resolution of approximately one millimeter or finer. Of course, less accurate sensors may be used, but the overall results of the system may be similarly less accurate. Preferable alignment sensors 18 include conventional narrow field-of-view laser sensors or conventional ultrasonic sensors, such as model RPS-401A-80QD, manufactured by Migatron. Alignment sensors 18 emit a signal (light or sound), which reflects off the body of vehicle 12, and is subsequently detected by alignment sensors 18. Based on the time delay between emission and subsequent detection of the reflected signal, the distance between each alignment sensor 18 and vehicle 12 may be calculated (the speed of light and sound assumed to be constant and known).

Two alignment sensors, identified as 18*a* and 18*b,* are preferably placed near the front and rear of vehicle 12 respectively and are oriented such that the signal they emit will reflect off the side body of vehicle 12. Alignment sensors 18*a* and 18*b* are preferably placed so that they are adjacent to a relatively flat (i.e., not contoured) body surface so that the reflected signal may be detected by the alignment sensor which transmitted such signal. Sensor 18*a,* located near the front of vehicle 12, is preferably rigidly mounted on positioning assembly 14, and thus rotates and translates with positioning assembly 14. In the example shown in FIG. 1, alignment sensor 18*a* determines the distance from sensor 18*a* to the front bumper of vehicle 12 and, provided such distance is greater than a predetermined distance, positioning assembly 14 is translated, as discussed in detail below, in the y-direction (i.e., toward or away from vehicle 12) until the distance from sensor 18*a* to vehicle 12 is within a predetermined distance range. Thus, alignment sensor 18*a* accounts for variations in the lateral displacement of vehicle 12 as it advances down the assembly line. The predetermined distance may be based on the model of the particular vehicle under test and set such that the actuator arm 16, when fully extended, is at least a minimum distance to allow the door 11 to travel freely for a certain distance (after disengaging with actuator arm 16), such as, for example two inches.

Similarly, alignment sensor 18*b* measures the distance from alignment sensor 18*b* to the rear of vehicle 12. As described in detail below, the difference between the two distances measured by alignment sensors 18*a* and 18*b* may be used to determine the rotational displacement of vehicle 12. The determined rotational alignment of vehicle 12 is used, as discussed in below, to rotate positioning assembly 14 such that actuator arm 16 impacts door 11 at constant location and angle. Alternatively, vehicle 12 may be rotated, while positioning assembly 14 is held constant.

Additionally, another embodiment of apparatus 10 may include a third alignment sensor 18*c,* located above vehicle 12. This third alignment sensor 18*c* may be used to determine the height of the particular vehicle 12 under inspection. This sensor would typically be used when different models of vehicles are expected to pass through apparatus 10. However, if the same model of vehicle continuously pass through apparatus 10, the height of the vehicle is typically known and constant and, thus, no height measurement may be required in real-time. However, even if the same model of vehicle is continuously passing through apparatus 10, the height of the vehicles may nonetheless vary depending on factors such as the type of wheels and tires installed on each particular vehicle. The height distance determined by using alignment sensor 18*c* may be used, as discussed in detail below, to adjust the height of positioning assembly 14 so that actuator arm 16 engages door 11 in a known, predetermined location.

Figure 2:
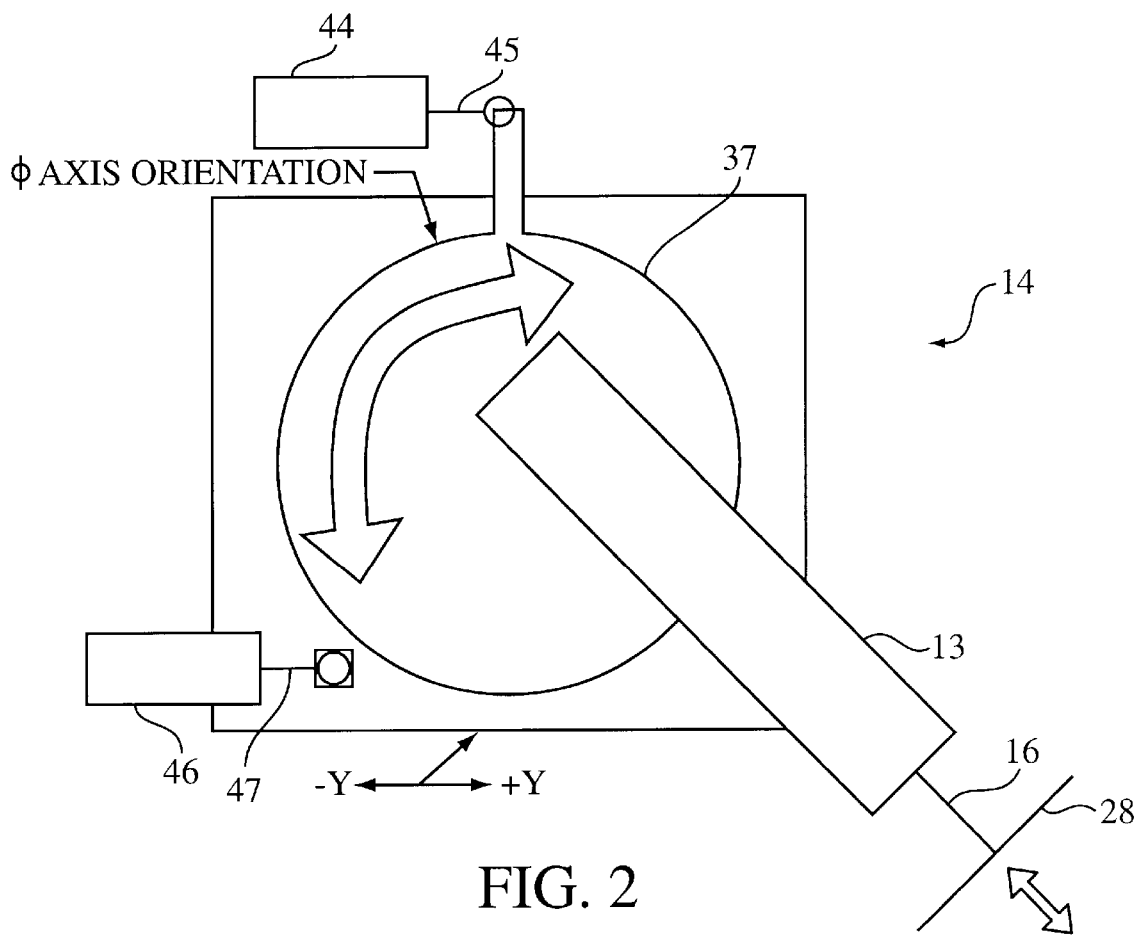
FIG. 2 is a plan view of a preferred positioning assembly for use with the present invention, showing the actuator arm extending outwardly therefrom.
Figure 3:
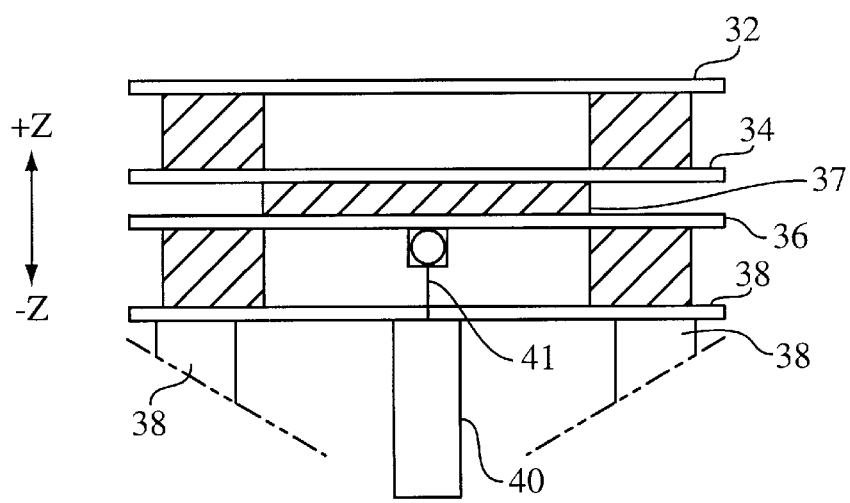
FIG. 3 is a side view of the positioning assembly shown in FIG. 2, illustrating the various translational platforms thereof.

Referring now to FIGS. 2 and 3, therein is shown a preferred positioning assembly 14, which provides precise positioning of actuator arm 16, enabling it to engage door 11 at a constant, predetermined location. Preferably, positioning assembly 14 includes two interconnected platforms providing two degrees of freedom. The interconnected platforms include lateral translation platform 32 (for translating actuator 13 in the y-direction (closer to door 11)), and rotational platform 34 (for rotating actuator 13 so that it is oriented to align with door 11). Optionally, positioning assembly 14 may include an adjustable height platform 36 (for adjusting the height of actuator 13), thus providing a third degree of freedom.

Rotational platform 34 is capable of rotating in accordance with the vehicle orientation variation determined using alignment sensors 18*a* and 18*b*. In a preferred design, position assembly 14 includes rotational actuator 44 mounted off-center and connected to a pivot point, shown as rotary table 37 in the center of rotational platform 34. Rotational actuator 44 has an arm 45 connected to rotary table 37, which extends and retracts to rotate rotary table 37 proportionately to such extension and retraction. Because vehicles in an assembly line generally are not more than ±10 degrees out of alignment, rotational actuator 44 and rotary table 37 may be designed such that the rotation angle of rotary table 37 is limited to ±10 degrees. Preferably, rotational actuator 44 is a conventional stepper motor driven linear ball screw actuator. Alternatively, a motorized rotary positioning stager rather than a linear actuator may be used to rotate rotary table 37. Rotary table 37 is fixed to lateral translational platform 32 and, thus, as rotary table 37 rotates, lateral translational platform 32 rotates as well.

Positioning assembly 14 further includes lateral translational actuator 46 having extendible arm 47 connected to lateral translational platform 32. Lateral translational actuator 46 moves lateral translational table 32 along glide tracks (not shown), such as, for example, Thompson shafts or equivalent guide apparatus, in accordance with the distance measured by alignment sensor 18*a* (as discussed below).

Positioning assembly 14 may also include height platform 36 to adjust actuator arm 16 in the z-direction. In this embodiment, a third actuator, height actuator 40 having extendible arm 41, is positioned to lift height platform 36, which in turn lifts lateral translational platform 32 and rotational platform 34, as well as actuator 13.

Preferably, conventional proximity (end of stroke) sensors (not shown) are mounted on positioning assembly 14, which may be used to stop actuators 40,44 and 46. The proximity sensors detect when the respective actuator's arms are near their maximum extension or retraction and provide a signal to shut off the actuators. Additionally, there may be mechanical stops used to prevent the arms from extending or retracting beyond an operational range. Positioning assembly 14 also preferably includes a support structure 38 comprising a base table and legs used to anchor positing assembly 14 to the floor.

Preferably actuators 40, 44, and 46 are stepper motor driven linear ball screw constant torque actuators. Alternatively, pneumatic systems may be used to drive these actuators. Movement of actuators 40, 44, and 46 is controlled through a programmable logic controller ("PLC") contained within electronic control unit 26. As is conventionally known, the PLC issues commands to stepper controller cards that are part of the PLC, the commands containing logic fields indicating the direction the actuator is to move its associated extension arm (i.e., extend or retract), the distance the arm is to move, the speed that actuator should move the arm, and the rate at which the actuator should accelerate or decelerate. The stepper controller in turn provides a command to a servo translator (located in electronic control unit 26), which then drives the motor housed with the actuator with a series of pulses, wherein each pulse moves the actuator a certain small amount.

Positioning assembly 14 further includes an attachment point for the electronically controlled actuator 13, preferably located on the top of lateral translation platform 32. Thus, as the platforms of positioning assembly 14 are translated and/or rotated, actuator 13 will also translate and rotate so that it may be positioned and oriented such that its extendible arm 16 impacts and engages with door 11 in a constant position and angle for a given model of vehicle.

Preferably, electronically-controlled actuator 13, which is rigidly mounted on the top of lateral translational platform 32, includes actuator arm 16 extending outwardly therefrom. Actuator arm 16 is operable to translate from its initial, fully-retracted position to a fully-extended position. Preferably, as discussed herein, lateral translational platform 32 is translated and rotated (in concert with rotary platform 34), based upon the distances measured by orientation sensors 18a and 18b, such that when actuator arm 16 is pushing door 11 toward its closed position and is fully extended, there will remain a short distance (i.e., two inches) remaining for door 11 to travel in order to engage the door latch assembly located on the body of vehicle 12.

A preferred design for actuator 13 uses a servo motor driven linear ball screw actuator. Actuator 13 is preferably a conventional post quadrature integrated constant velocity actuator to extend actuator arm 13 at a constant velocity. Actuator 13 also preferably employs conventional encoder feedback for verifying and controlling the velocity at which actuator arm 16 is extended. Alternatively, actuator 13 may comprise a pneumatic linear actuator with appropriate feedback to enable velocity control, although a pneumatic actuator is less desirable because typically pneumatic actuators do not provide reliable velocity control.

Movement of actuator arm 16 using actuator 13 is controlled through the PLC contained within electronic control unit 26. As is conventionally known, the PLC issues commands to a stepper controller card that is part of the PLC, the commands containing logic fields indicating the direction actuator 13 is to move (i.e., extend or retract), the speed that actuator should move, and the rate at which actuator 13 should accelerate or decelerate. The stepper controller in turn provides a command to a servo translator (located in electronic control unit 26), which then drives the motor housed with actuator 13 with a series of pulses.

Preferably, actuator arm 16 has a door contact assembly 28, located at the distal end of arm 16 (i.e., the end nearest door 11). Door contact assembly 28 preferably includes a means for detecting the presence of door 11, such as a conventional proximity detector. An acceptable proximity detector is model 871TM-BH5N18-N3 Normally Open Inductive Sensor, manufactured by Allen-Bradley. The proximity detector preferably detects when door contact assembly 28 comes in contact with door 11, upon which outward movement of actuator arm 16 may be initiated to engage door 11. Alternatively, door contact assembly 28 may be attached to actuator arm 16 using a spring mechanism and a sensor may be attached to detect compression of the spring, a certain amount of compression indicating presence of door 11 coming into contact with door contact assembly 28.

In a preferred embodiment, door contact assembly 28 further includes a positive attachment mechanism (e.g., suction) to maintain door 11 in physical contact with door contact assembly 28 while actuator arm 16 is extending and closing door 11. Door contact assembly 28 may include a positive suction mechanism, such as a vacuum to seal door contact assembly 28 to door 11. The suction mechanism may be initiated when the proximity detector detects door 11. The suction may be maintained and released in one of two ways. First, the suction may be maintained throughout the initial closing of door 11 and, after actuator arm 16 is moved a specified distance and closes door 11 to an almost fully closed position, the suction may be released to allow door 11 to freely close over the remaining small distance. Alternatively, the suction may be initiated upon door contact assembly 28 contacting door 11 and gradually released during the entire duration that actuator arm 16 is pushing door 11 such that, at the time door 11 is near vehicle 12 and should disengage from door closing assembly 28, the suction is fully released. Additionally, in the embodiment using suction attachment, preferably door contact assembly 28 is highly compliant, i.e., it bends to allow door contact assembly 28 to remain in contact with door 11 as it is closing and while vehicle 12 is moving.

Alternatively, door contact assembly 28 may include a sufficiently padded surface (e.g., a rotatable rubber surface) to ensure that the finish of door 11 will not be scratched or marred during the test.

Apparatus 10 further includes a non-contacting door measuring distance sensor, such as, for example, laser distance sensor 20, used to measure the final closing velocity of door 11. Laser distance sensor 20 preferably is connected to, and moves and rotates with, lateral translational platform 32 so that the laser beam it generates extends substantially parallel to the floor in which the system is installed and is directed to door 11. Additionally, by mounting laser distance sensor 20 such that it is connected to lateral translational platform 32, sensor 20 rotates and translates along with actuator arm 16 and, thus, is aligned with door 11. Preferably, laser distance sensor 20 has a resolution of approximately one millimeter or finer, and has a tight field-of-view (e.g., 2 mm). Laser distance sensor 20 must be operable at a repetition rate commensurate with the anticipated speed with which door 11 is closed (e.g., 30 Hz or greater). Laser distance sensor 20 may be, for example, a visible light laser sensor, model DME-2000-000S01, manufactured by Sick, or any other commercially available laser equipment having the required specifications.

Apparatus 10 further preferably includes fore and aft wheel sensors, 22a and 22b, that detect when the front wheel of vehicle 12 is at certain positions. As explained in detail below, laser distance sensor 20 may also be operable to determine if door 11 properly engaged the latch assembly and was fully closed as a result of actuator arm 16 pushing door 11 closed. As further explained below, the determination of whether door 11 properly closed entails the taking of two distance measurements taken while vehicle 12 progresses through apparatus 10. Fore and aft wheel sensors, 22a and 22b, are used to determine when the two required distance measurements are preferably taken.

Preferably, fore and aft wheel sensors, 22a and 22b, are optical sensors, such as a conventional infrared LED source and detector, oriented to emit their optical signals in a direction toward the front wheel of vehicle 12. The optical signals are reflected of reflectors 24a and 24b, which are positioned such that the wheels of vehicle 12 will travel between fore and aft wheel sensors, 22a and 22b, and their corresponding reflectors 24a and 24b. When the front wheel of vehicle 12 travels between sensor 22a or sensor 22b and its corresponding reflector, 24a or 24b, the optical beam is interrupted. Alternatively, an ultrasonic or laser sensor may be employed as wheel sensors 22a and 22b.

Preferably, apparatus 10 further includes electronic control unit 26, which preferably contains a conventional programmable logic controller (or microprocessor operating under software control) for overall system control. The PLC, such as, for example, a model SLC 5/03, manufactured by Allen-Bradley, receives and processes and transmits signals from and to the various sensors and components of apparatus 10.

Electronic control unit 26 further preferably includes a man/machine interface, such as a conventional keyboard and display, with which an operator may use to set certain system variables and parameters, such as, for example, the desired initial closing velocity. The man/machine may also be used to report system failures and diagnostics. Control unit 26 may also include means to record the results of the tests conducted using apparatus 10 including the total number of vehicles tested, the number of vehicles that did not pass (i.e., the final door closing velocity was not within an established range or the door did not fully close), and the type of each failure.

Additionally, electronic control unit 26 preferably houses the controls for the up to four actuators 13, 40, 44 and 46 used in apparatus 10. In a preferred design (using stepper motor driven linear ball screw actuators), the two (or three) actuators driving the platforms of the positioning assembly 14 are running open loop. Preferably, actuator 13 driving actuator arm 16 uses encoder feedback to a servo system to actively control its velocity. An acceptable implementation uses a Parker Hannifin Zeta Drive for the stepper motor controls and a Parker Hannifin TQ10SD servo control for actuator 13.

Having described the various presently preferred components comprising the present invention, the operation of apparatus 10 may now be described with reference again to FIG. 1. A vehicle 12 advancing down an assembly line begins to enter apparatus 10 traveling in the +x direction. The particular door to be tested is opened prior to entering into apparatus 10. Presence of vehicle 12 will preferably be detected by bar code reader 15 detecting and reading information off a bar code placed on the window of door 11. Preferably, bar code reader 15 reads the vehicle identification number (which also includes the vehicle model information) off of the bar code. This information, including the fact that a vehicle is entering into apparatus 10 may be transmitted to a conventional personal computer connected to the PLC within electronic control unit 26. The model and vehicle identification number may be stored by the PLC in a system database, along with the eventual results of the test. In certain embodiments, the model of the vehicle may be used as a factor in adjusting positioning assembly 14 and actuator 13 and for controlling the amount of force applied by actuator 13.

Upon detection of a vehicle entering into apparatus 10, the system determines the vehicle's precise lateral displacement (in the y-direction), orientation, and, optionally, the vehicle height. This is preferably accomplished using alignment sensors 18 and using these measurements, the system can adjust the position and orientation of actuator 13 so that actuator arm 13 in an predetermined spatial relationship with door 11 so that actuator arm 13 engages and pushes door 11 at a constant location and angle. First, the orientation angle of vehicle 12 is determined. Alignment sensors 18a and 18b transmit a signal, which reflects off the body of vehicle 12 and is detected again by the transmitting sensors. Based upon the delay from the emission of the signal and its subsequent detection after reflection off vehicle 12, the distance from each of the alignment sensors 18a and 18b to the vehicle may be determined. These two distance measurements are reported by alignment sensors 18a and 18b to the PLC within electronic control unit 26. Logic contained within the PLC then determines the orientation angle of vehicle 12. For example, knowing the distances determined from each of the alignment sensors 18a and 18b, and the distance between the alignment sensors 18a and 18b, using principles of geometry, the PLC may calculate the orientation angle of vehicle 12. Alternatively, the rotational displacement of vehicle 12 may be determined using a look up table, wherein the input to the table is the difference between the two distance measurements and the output from the table is the vehicle orientation displacement angle.

This calculated vehicle orientation displacement angle is used to rotate rotary table 37. The rotation of rotary table 37 may also depend on the model of the particular vehicle 12 under inspection. The PLC transmits an appropriate signal to the actuator control associated with rotational actuator 44 such that arm 45 will extend or retract an amount appropriate to cause rotary table 37 to rotate an amount equivalent to the orientation angle of vehicle 12. Rotary table 37 in turn causes lateral translation platform 32 and actuator 13 mounted thereon, to rotate by the same angle. It should be noted that actuator 13 is initially oriented to align with a fully opened door 11 assuming that vehicle 11 is entering apparatus 10 without any angular displacement.

Next, apparatus 10 accounts for any lateral variation in vehicle 12. Lateral translational actuator 46 begins extending its associated arm 47 in order to move lateral translational platform 32 closer to vehicle 12. During this time, alignment sensor 18a continues to determine the distance to vehicle 12 and report such distance to the PLC. The PLC in turn continues to instruct the actuator control associated with lateral translational actuator 46 to move lateral translational platform 32 (and thereby actuator 13) closer to vehicle 12, until the distance between alignment sensor 18a and vehicle 12 reaches a certain value. This value is such that the door contact assembly, with arm 16 retracted, is in contact with door 11 (or very close in proximity to it), and that, upon full extension of actuator arm 16 (pushing door 11 closed), door 11 will release from door contact assembly 28 and will still have a short distance to travel before contacting the door latch mechanism. Additionally, based upon the distance measurement taken from alignment sensor 18c, the height of actuator 13 may be adjusted. Alignment sensor 18c reports its height determination to the PLC, which then instructs the actuator control associated with height actuator 40 to lift (or lower) height platform 36 such that actuator arm 16 will engage door 11 near a central position (in height) on door 11. At this point in the test, actuator 13 is properly aligned and closing of door 11 may begin.

As apparatus, using alignment sensors 18 and the components of positioning table 14, orients and aligns actuator 13, vehicle 12 is continuing to progress through apparatus 10, i.e., the assembly conveyor does not stop during the test. Movement of vehicle 12 by the assembly line conveyor system eventually brings door 11 in contact with door contact assembly 28. A proximity sensor located on door contact assembly 28 detects the presence of door 11 coming into contact with door contact assembly 28 and transmits a signal to the PLC. The PLC then instructs the actuator controls associated with actuator 13 to extend arm 16 to begin closing door 11 with an initial controlled force or an essentially constant closing velocity. Preferably, the controlled force and velocity is appropriate for the model of vehicle under inspection. Actuator arm 16 then reaches its full extension and disengages with door 11, which then continues to swing (freely) closed. Preferably, door 11 will have sufficient time to attempt to close after disengagement from door contact assembly 28. The remaining distance for door 11 to travel after disengaging with door contact assembly 28 is short, e.g., two inches. During the time period that door 11 is freely swinging closed (i.e., after disengaging with door contact assembly 28), laser distance sensor 20 takes at least two measurement readings. Alternatively, because of the short amount of time between when door 11 disengages with door contact assembly 28, the readings (or at least the first reading) may occur while door 11 is still in contact with door contact assembly 28. The measurement readings, taken at a fixed time interval, indicate the distance between laser distance sensor 20 and door 11. Alternately, the measurement readings may indicate the distance between door 11 and a fixed point on vehicle 12, such as, for example, the body panel adjacent the door opening. By taking the difference between the two distance measurements and by dividing the time interval between each reading, the velocity that door 11 travels after disengaging from door contact assembly 28 may be determined. This velocity value may then be recorded by the PLC and compared to a pre-stored range of acceptable values to determine if the measured velocity value falls within the allowable range for the particular model of vehicle under inspection.

When the apparatus 10 incorporates a door contact assembly 28 having the described suction mechanism to seal door 11 to door contact assembly 28 while actuator arm 16 is pushing door 11 closed, the initiation of the door velocity measurements may be varied. For example, when the suction pressure is released (either based on actuator arm 16 extending a certain distance or for a certain time period), laser distance sensor 20 may begin taking the distance measurements. As another alternative, laser distance sensor 20 may continuously take and report distance measurements (starting when the door contact assembly 28 first contacts door 11), but these measurements are not used until door 11 comes into the field-of-view of laser distance sensor 20 (i.e., when the measurement falls within a pre-calculated expected range).

If the measured velocity value falls outside the acceptable range, apparatus 10 may take a number of actions, including, recording the failure in a system database, initiating visual and/or audio alarms, displaying the error on the man/machine interface, and sending a signal to the assembly line conveyor using communication interface 17 to stop the assembly line so that the vehicle under inspection may be removed and its failed door replaced and/or properly aligned.

Apparatus 10 may also be used to determine if, after being pushed with a constant force or velocity, door 11 eventually engages the latch mechanism and properly closes. This determination is made by comparing if door 11, after being closed, is flush with the body panel directly behind door 11 (or within an acceptable tolerance). After door 11 is pushed closed, vehicle 12 continues to advance through apparatus 10. The front wheel of vehicle 12 blocks the signal emitted from aft wheel sensor 22b, indicating to the PLC that the rear edge of door 11 (i.e., the edge away from the door hinge) is aligned with laser distance sensor 20. Laser distance sensor 20 then measures the distance to door 11 and transmits this first distance measurement to the PLC. As the vehicle continues to advance through apparatus 10, the front wheel of vehicle 11 interrupts the signal emitted from fore wheel sensor 22a, indicating that laser distance sensor 20 is now aligned with a position that is not on the door but is on the vehicle proximate the door, for example, the portion of the body panel of vehicle 12 directly behind door 11. Laser distance sensor 20 then measures the distance to the body panel and transmits this second distance measurement to the PLC. By comparing these two distance measurements, apparatus 10 can determine if the door properly closed as a result of being pushed by actuator arm 16. If the difference between the two distance measurements is above a set threshold (such as, for example, 10 mm), door 11 did not properly close and fails this portion of the test. As with the door velocity test, apparatus may record the failure in a system database, initiate visual and/or audio alarms, display the error on the man/machine interface, and/or send a signal to the assembly line conveyor using communication interface 17 to stop the assembly line so that the vehicle under inspection may be removed and its failed door replaced and/or properly aligned.

Once door 11 has been tested, generally indicated by fore and aft wheel sensors 22a and 22b indicating that both the front and rear wheels of vehicle 12 have passed though apparatus 10, the system is re-set for the next vehicle. Thus, all the actuators on positioning assembly 14, including actuator 13, are returned to their initial positions. Typically, each door on a vehicle is tested one at a time, because the manufacturer's specification for final closing velocity is specified assuming maximum pressure inside the vehicle (i.e., only one door is opened, and all windows, vents, trunk lids, etc. are closed and properly sealed), and does not account for the pressure differences inside the vehicle as a result of a different number of doors being open.

Thus, as disclosed herein, the preferred apparatus is capable of measuring the final closing velocity of a vehicle door without any contact with the vehicle under inspection, making it possible to prevent any problems which may occur when such measurement is taken in contact with the vehicle, such as scratching or marring the finish of the vehicle. The apparatus of the present invention may be configured for use on an assembly line wherein a plurality of vehicles pass through the apparatus and each of the vehicles doors are tested to ensure that the final closing velocity, after being pushed with a constant force or velocity, with within a predetermined range and/or whether the door properly closes.

The previously described apparatus of the present invention has many advantages. Using the present invention, reliable testing of each door of every vehicle manufactured is technically and economically feasible. Additionally, because the test can be conducted automatically, with no manual intervention, the invention results in decreased labor costs and eliminates operator error as a contributor to incorrect test results. As another advantage over prior art techniques, contact is made with the vehicle only to begin closing the door. Measurement of the door velocity and detection of correct operation are performed without further contact of the vehicle, which eliminates the potential for scratching or marring the surface of the vehicle during the test. The results of the fully-automated test may be recorded and retained in a database, enabling the manufacturer to track statistical variations in door closing velocities as well as pass/fail rates. Furthermore, the invention may be used to conduct a test with quality equivalent to, or higher than, the prior art methods.

The principles of the present invention may be used to determine the final closing velocity of doors other than conventional passenger doors, such as, for example, trunk lids, hatches, lift gates, and sliding doors (typically installed on vans and minivans) or for moveable members on other types of objects, such as, for example, a door on a household or commercial appliance. For example, to re-configure apparatus 10 to test sliding doors, actuator 13 may be re-positioned on positioning assembly 14 such that actuator arm 16 points in the x-direction (as labeled on FIG. 1) toward the front of the vehicle (assuming the sliding door slides toward the rear of the vehicle when opening the door). Thus, actuator arm 16 can extend so that door contact assembly 28 engages the rear edge of the sliding door to push the door closed. Laser distance sensor 20 is positioned to take distance measurements of the rear edge of the sliding door (i.e., distance sensor 20 is oriented so that its beam projects toward the front of the vehicle and intersects the rear edge of the sliding door).

Although the present invention has been described in considerable detail with reference to certain presently preferred versions thereof, other versions are possible without departing from the spirit and scope of the present invention. Therefore the appended claims should not be limited to the description of the preferred versions contained herein.

I claim:

1. An apparatus for determining the velocity of a movable member of an object as the movable member moves from an initial first position toward a second position with respect to a fixed point on the object, the apparatus usable with a series of objects as the objects advance in sequence to be proximate the apparatus, the apparatus comprising:

(a) movement means for controllably engaging and moving the movable member from its initial first position toward the second position by temporarily applying controlled force to the movable member and so that the movable member can continue to progress toward the second position after the controlled force has been applied to the movable member;

(b) positioning means for positioning the movement means or the object so that moving the movable member of the object with the controlled force occurs when the movement means is in a predetermined spatial relationship with respect to the movable member;

(c) means for determining the orientation of the object or of the movable member with respect to the movement means and for causing the positioning means to position the movement means or the object so that the movement means is in the predetermined spatial relationship with the movable member;

(d) distance sensing means for determining in timed relationship at two separate movable member positions as the movable member moves from the first position toward the second position after the controlled force has been applied to the movable member (i) the distance between the movable member and the fixed point on the object or (ii) the distance between the movable member and the distance sensing means, thereby obtaining two distance determinations for the movable member at the two separate movable member positions; and (e) velocity determination means for determining the velocity of the movable member from the two distances determined using the distance sensing means.

2. The apparatus of claim 1 further comprising means for bringing a second object in the series and having a movable member into proximity with the movement means so that the controlled force can be applied to the movable member of the second object when the movement means is in a predetermined spatial relationship with respect to the movable member of the second object and the velocity of the movable member of the second object resulting from application of the controlled force can be determined by the velocity determination means.

3. The apparatus of claim 1 wherein the positioning means can move the movement means vertically, horizontally, and rotationally.

4. The apparatus of claim 1 further comprising means for detecting when the movable member is proximate the movement means so that the movement means can commence applying the controlled force to the movable member.

5. The apparatus of claim 1 further comprising means for controlling the movement means so that while the controlled force is temporarily being applied to the movable member by the movement means, the movable member is being moved by the movement means at essentially constant velocity.

6. The apparatus of claim 1 wherein the movement means comprises an actuator that engages the movable member and moves outwardly to apply the controlled force.

7. The apparatus of claim 6 wherein the actuator disengages from the movable member after it has applied the controlled force.

8. The apparatus of claim 6 further comprising means for detecting when the movable member is proximate the actuator of the movement means so that the actuator can commence applying the controlled force to the movable member.

9. The apparatus of claim 8 further comprising means for maintaining the actuator's engagement of the movable member while the controlled force is being applied.

10. The apparatus of claim 8 further comprising means for disengaging the actuator from the movable member after the actuator has applied the controlled force.

11. The apparatus of claim 1 further comprising means for determining whether the velocity determined by the velocity determination means falls within a predetermined range.

12. The apparatus of claim 11 further comprising means for generating an output signal if the velocity determined by the velocity determination means falls outside of the predetermined range.

13. The apparatus of claim 1 adapted for the object being a vehicle on a vehicle assembly line, the movable member being a door, the second position of the movable member being the fully closed position of the door, and the velocity determined by the velocity determination means being the closing velocity of the door just before it closes.

14. The apparatus of claim 13 adapted for the vehicle being followed by other vehicles on the vehicle assembly line and the apparatus being adapted for determining the closing velocity of the doors on a plurality of the vehicles.

15. The apparatus of claim 14 further comprising means for determining the model of the vehicle and for adjusting the movement means, the amount of controlled force to be applied, and the positioning means based on the determination of the model of the vehicle.

16. The apparatus of claim 14 further comprising means for recording the closing velocity the door of each of the plurality of vehicles.

17. The apparatus of claim 1 wherein the distance sensing means comprises a laser distance sensor.

18. Apparatus for determining the closing velocity of a door of a vehicle as the door moves from an open position toward the closed position with respect to a fixed position on the vehicle, the apparatus usable with a series of vehicles on a vehicle assembly line as the vehicles advance in sequence to be proximate the apparatus, the apparatus comprising:

(a) movement means for controllably engaging and moving the door from its open position toward the closed position by temporarily applying controlled force to the door and so that the door can continue to progress toward the closed position after the controlled force has been applied to the door;

(b) positioning means for positioning the movement means or the vehicle so that moving the door with the controlled force occurs when the movement means is in a predetermined spatial relationship with respect to the door;

(c) means for determining the orientation of the vehicle or of the door with respect to the movement means and for causing the positioning means to position the movement means or the vehicle so that the movement means is in the predetermined spatial relationship with the door;

(d) distance sensing means for determining in timed relationship at two separate door positions as the door moves from the open position toward the closed position after the controlled force has been applied to the door (i) the distance between the door and the fixed point on the vehicle or (ii) the distance between the door and the distance sensing means, thereby obtaining two distance determinations for the door at the two separate door positions; and (e) velocity determination means for determining the closing velocity of the door from the two distances determined using the distance sensing means.

19. The apparatus of claim 18 further comprising means for bringing a second vehicle in the series and having a door into proximity with the movement means so that the controlled force can be applied to the door of the second vehicle when the movement means is in a predetermined spatial relationship with respect to the door of the second vehicle and the velocity of the door of the second vehicle resulting from application of the controlled force can be determined by the velocity determination means.

20. The apparatus of claim 18 wherein the positioning means can move the movement means vertically, horizontally, and rotationally.

21. The apparatus of claim 18 further comprising means for detecting when the door is proximate the movement means so that the movement means can commence applying the controlled force to the door.

22. The apparatus of claim 18 further comprising means for controlling the movement means so that while the controlled force is temporarily being applied to the door by the movement means, the door is being moved by the movement means at essentially constant velocity.

23. The apparatus of claim 18 wherein the movement means comprises an actuator that engages the door and moves outwardly to apply the controlled force.

24. The apparatus of claim 23 wherein the actuator disengages from the door after it has applied the controlled force.

25. The apparatus of claim 23 further comprising means for detecting when the door is proximate the actuator of the movement means so that the actuator can commence applying the controlled force to the door.

26. The apparatus of claim 25 further comprising means for maintaining the actuator's engagement of the door while the controlled force is being applied.

27. The apparatus of claim 25 further comprising means for disengaging the actuator from the door after the actuator has applied the controlled force.

28. The apparatus of claim 18 further comprising means for determining whether the velocity determined by the velocity determination means falls within a predetermined range.

29. The apparatus of claim 28 further comprising means for generating an output signal if the velocity determined by the velocity determination means falls outside of the predetermined range.

30. The apparatus of claim 18 further comprising means for determining the model of the vehicle and for adjusting the movement means, the amount of controlled force to be applied, and the positioning means based on the determination of the model of the vehicle.

31. The apparatus of claim 18 further comprising means for recording the closing velocity the door of each of the plurality of vehicles.

32. The apparatus of claim 18 wherein the distance sensing means comprises a laser distance sensor.

* * * * *